United States Patent

Sakakibara et al.

[11] 4,234,612
[45] Nov. 18, 1980

[54] CONTINUOUS FRYING METHOD

[76] Inventors: Sakuichi Sakakibara, No. 1-8, 2-chome, Uozaki-kita-machi, Higashinada-ku, Kobe-shi, Hyogoken; Ko Sugisawa, No. 8-15, 2-chome, Chiyogaoka, Nara-shi, Nara-ken; Junji Majima, No. 12-21, Kita-Showa-cho, Nishinomiya-shi, Hyogo-ken; Ryusuke Nakanaga, No. 7-22, Fujinosato-cho, Takatsuki-shi, Osaka-fu, all of Japan

[21] Appl. No.: 963,274

[22] Filed: Nov. 24, 1978

Related U.S. Application Data

[60] Division of Ser. No. 844,585, Oct. 25, 1977, which is a continuation of Ser. No. 681,437, Apr. 29, 1976, abandoned.

[51] Int. Cl.$^3$ .............................................. A23L 1/16
[52] U.S. Cl. ..................... 426/394; 426/439; 426/451; 426/505; 99/443 C
[58] Field of Search ............... 426/438, 439, 441, 402, 426/394, 392, 412, 505, 496, 400, 128, 113, 112, 115, 465, 451; 53/440, 431, 437; 366/101, 107, 144; 99/348, 404, 405, 408, 443 C, 406, 352

[56] References Cited

U.S. PATENT DOCUMENTS

| | | | |
|---|---|---|---|
| 2,616,359 | 11/1952 | Pierson | 99/408 X |
| 2,855,308 | 10/1958 | Buechele et al. | 426/438 |
| 3,236,196 | 2/1966 | Ibex | 426/439 |
| 3,309,981 | 3/1967 | Benson et al. | 99/405 |
| 3,310,881 | 3/1967 | Fritzberg | 426/438 X |
| 3,391,634 | 7/1968 | Williams et al. | 99/405 |
| 3,474,726 | 10/1969 | Corbin | 99/404 |
| 3,618,587 | 11/1971 | Lee | 99/348 X |
| 3,736,862 | 6/1973 | Crommelijnck | 99/405 X |
| 3,849,900 | 11/1974 | Dale et al. | 366/144 X |
| 3,966,983 | 6/1976 | Dexter et al. | 426/438 X |
| 4,006,260 | 2/1977 | Webb et al. | 426/438 |

Primary Examiner—Kenneth M. Schor
Attorney, Agent, or Firm—Toren, McGeady and Stanger

[57] ABSTRACT

A frying method in which hot oil is discharged upward from nozzles at the bottom of a frying tank at high pressure while a perforated container holding tightly packed noodles is conveyed in a horizontally extending path through the oil. The pressure of the hot oil forces the noodles apart so that they are fried uniformly. The frying of the noodles dehydrates them to the desired degree.

5 Claims, 5 Drawing Figures

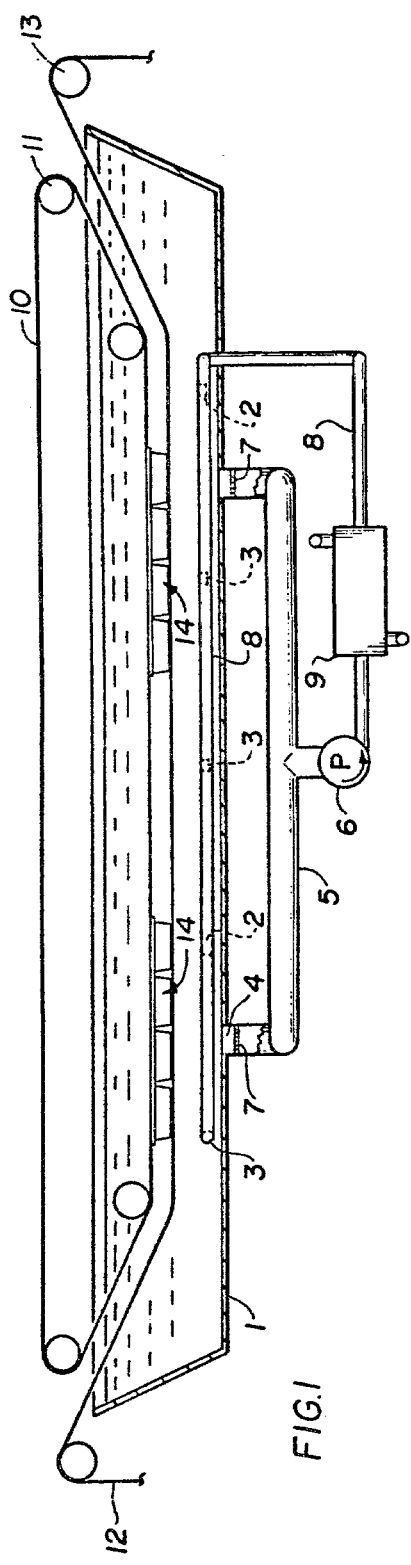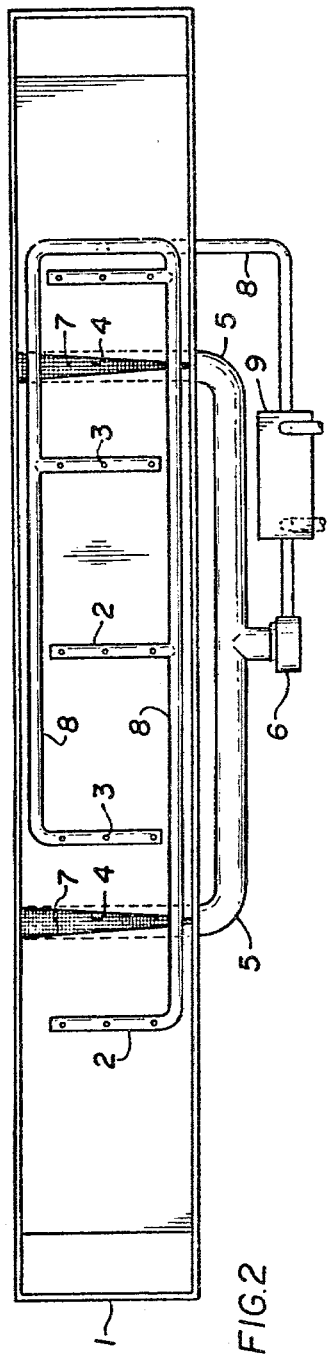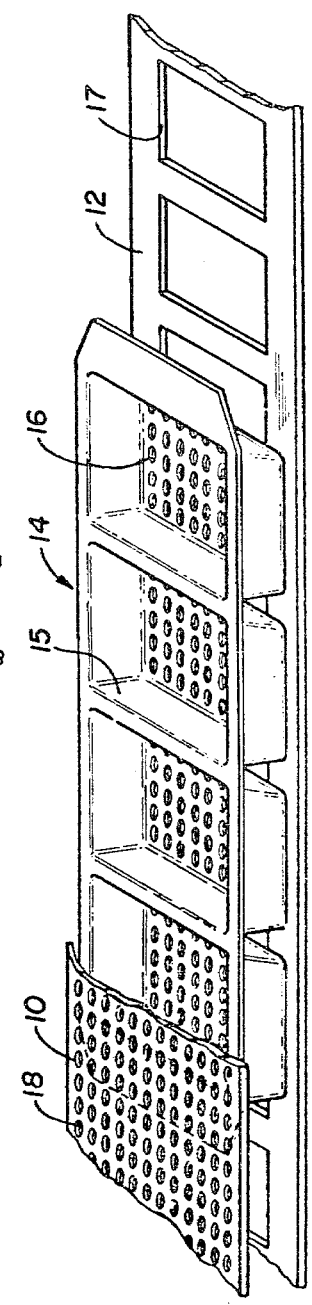

CONTINUOUS FRYING METHOD

This application is a division of the copending application Ser. No. 844,585 filed Oct. 25, 1977, which is, in turn, a continuation of application Ser. No. 681,437 filed Apr. 29, 1976, now abandoned.

This invention relates to a frying method, and particularly to a method for continuously passing food to be fried through hot oil.

This invention will be described with specific reference to the manufacture of instant fried noodles which are a staple food in Japan and are finding increasing acceptance in the United States. The method disclosed and claimed hereinbelow, however, is suitable for frying other particulate food.

In the manufacture of instant fried noodles, a dough is prepared from wheat or buckwheat flour which is kneaded with Kansui (a mixture of alkali metal carbonates and phosphates), vegetable gum, seasoning, and water, rolled into a sheet, and the sheet is cut into strips having a typical width of 1-2 mm. The raw noodles so obtained are steamed and thereafter fried in oil to remove most of the water and to stabilize the starch in the noodles. The dehydrated noodles may then be stored for extended periods of time without spoiling, and become soft and edible again when immersed in boiling water for about three minutes.

The storage life of the dehydrated noodles and the taste of the reconstituted noodles are greatly affected by the manner in which the noodles are fried. The narrow raw noodles pack very densely in a perforated container in which they are immersed in hot oil. Steam is released from the noodles in contact with the oil whose temperature is well above 100° C. It is common, therefore, to find that noodles located at the bottom of the batch are overdone or actually scorched, and are not reconstituted adequately in subsequent boiling. Noodles located at the top of a frying batch are cooled by steam released from lower layers and may not keep well in storage because of insufficient dehydration. Moreover, the center of a batch may not be reached by adequate amounts of sufficiently hot oil. It is neither practical to return insufficiently fried noodles to the hot oil nor to remove overcooked noodles. When noodles fried to different degrees are mixed to obscure the inhomogeneity of the batch, the taste of the reconstituted mixed batch is unfavorably affected.

An object of the invention is frying instant noodles uniformly regardless of their specific location in a batch of initially raw noodles and of frying food other than noodles which presents similar problems.

According to the invention, a particulate, water-bearing food is fried after being packed batchwise in perforated containers. The packed containers are conveyed sequentially in a predetermined path, and a stream of oil is discharged against the conveyed containers in a portion of the path under a pressure sufficient for the oil to enter each container through its perforations and to force the particles of the food in the container apart for access of the oil to substantially all surfaces of the particles. Contact between the food in the containers and the oil is maintained long enough to at least partly dehydrate the food, the temperature of the oil being sufficient to convert a portion of the water in the food to steam. The partly dehydrated food then is separated from the oil.

Other features, additional objects, and many of the attendant advantages of this invention will be readily appreciated as the same becomes better understood by reference to the following detailed description of a preferred embodiment when considered in connection with the appended drawing in which:

FIG. 1 shows frying apparatus for performing the method of the invention in side elevation and partly in section;

FIG. 2 is a top plan view of elements of the apparatus of FIG. 1;

FIG. 3 is a perspective, partly fragmentary view of a container and associated conveyor belts in the apparatus of FIG. 1 on a larger scale;

Figure 5:
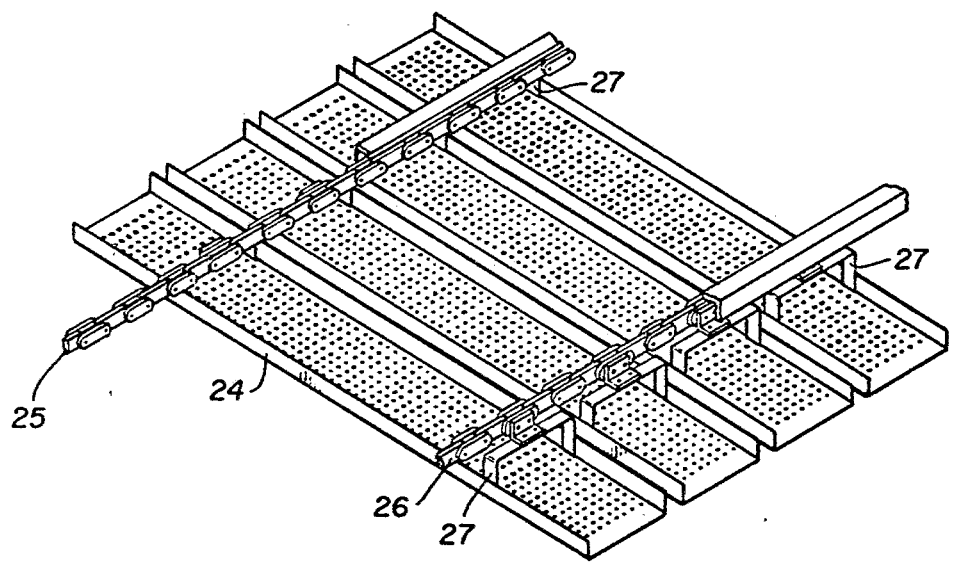
FIG. 5 shows a second modified conveyor belt in a view corresponding to that of FIG. 4.

Referring now to the drawing in detail, and initially to FIG. 2, there is seen an elongated tank 1 supplied with hot oil through a row of five horizontal, parallel pipes 2 mounted on the bottom wall of the tank and each formed with upwardly directed openings or orifices 3. The pipes 2 are spaced longitudinally of the tank 1 and are elongated transversely to the direction of tank elongation. Two openings 4 are provided in the bottom wall of the tank 1 between the two first pipes 2 of the row and between the two last pipes. Horizontal sections of pipes 5 communicate with the tank cavity through the openings 4 which taper in a triangular pattern in the direction of liquid flow through the openings 4 outward of the tank 1.

The pipes 5 lead to the intake of a circulating pump 6, and the pump is protected against damage by solid particles in the pumped liquid by screens 7 in the triangular openings 4. The discharge conduit 8 of the pump 6 is provided with a heat exchanger 9 and is a manifold connected to the several apertured pipes 2 which thus constitute discharge nozzles.

As is shown in FIG. 1, a perforated conveyor belt 10 is trained over partly driven rollers 11 in a closed loop having two horizontal sections connected by obliquely inclined sections which converge downwardly. The lower horizontal section of the conveyor belt 10 is immersed below the level of hot oil maintained by the pump 6 in the tank 1. A second apertured conveyor belt 12 is trained over guide and drive pulleys 13 in a closed loop, only partly shown, and passes through the tank 1 below the lower horizontal section of the belt 10 with sufficient tension to hold containers 14 in sealing engagement with the belt 10 as the containers are carried through the tank 1 between the belts 10, 12 in a path having a predominant horizontal component.

One of the several identical containers 14 is shown in FIG. 3. It is a shallow, elongated, rectangular trough whose upwardly open cavity is divided into four compartments by transverse partitions 15. Perforations 16 in the bottom wall of the container 14 are dimensioned to admit liquid discharged from the nozzles 2 through the much wider openings 17 in the belt 12 into the compartments of the container 14. The perforations 18 in the conveyor belt 10 are equal in size and spacings to the perforations 16 to permit passage of oil while substantially preventing escape of noodles or other particulate food from the container.

It has been found that hot oil can be discharged from the orifices 3 perpendicularly or obliquely against the underside of the traveling containers 14 to force apart noodles packed into the several compartments and permit the oil to reach virtually all surfaces of each noodle at a rate sufficient to produce a uniformly dried product. Steam generated by contact of the noodles with the hot oil is distributed fairly uniformly within each compartment by turbulence and carried off by the rapid stream of oil at a rate to minimize its effect.

The size of the compartments in the container 14 is chosen to suit packaging machinery, not shown, to which the containers 14 are transferred after leaving the tank 1. Each compartment is packed with a uniform weight of noodles adequate to fill a package of chosen uniform size.

Figure 4:
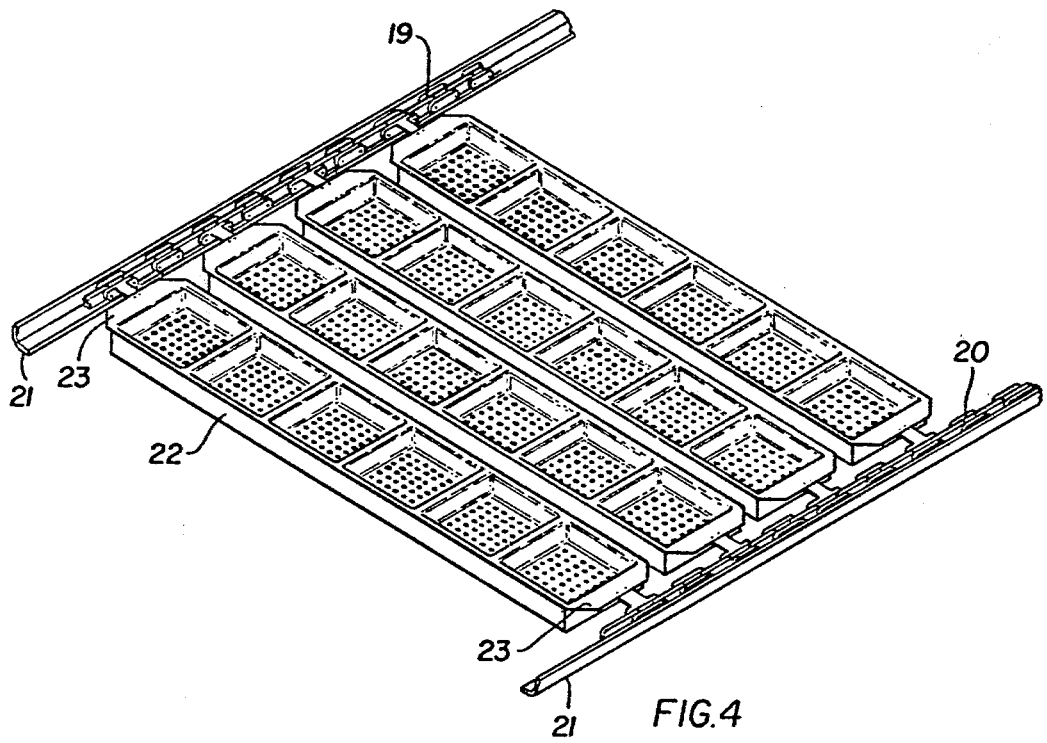
FIG. 4 is a perspective, fragmentary view of a modified first conveyor belt including built-in containers.

In the otherwise unchanged apparatus partly illustrated in FIGS. 4 and 5, link chains 19, 20 are guided in spacedly parallel, closed loops through a tank of hot oil, being guided by horizontal rails 21 in the tank, not itself illustrated. Containers 22, elongated transversely to the direction of conveyor movement, but otherwise closely similar to the containers 14, are permanently attached to the chains 19, 20 by means of flanges 23 at the longitudinal ends of each container. The perforated conveyor belt 10 is replaced in the modified apparatus of FIGS. 4 and 5 by two link chains 25, 26 and by trough-shaped covers 24 attached to the chains 25, 26 by hangers 27. The covers 24 correspond in width, length, and orientation to the containers 22 and are guided through the non-illustrated oil tank to retain the noodles in each container in a manner evident from FIG. 1. The covers 24 are perforated as is the conveyor belt to permit passage of steam and oil.

The method of the invention is employed to advantage in frying food that presents similar problems as the noodle dough more specifically described above. Because the strips of noodle dough in each container are elongated in a common direction and packed side by side in several superimposed layers, the output pressure of the pump 6 and the velocity of each oil stream must be chosen to force the strips of noodle dough apart without opening merely a few channels of preferred flow. When the oil has access to the surfaces of substantially all particles, it not only causes at least partial evaporation of the water in the dough, but also uniform discharge of the steam in the direction of oil discharge from the containers which is predominantly upward.

It should be understood, of course, that the foregoing description relates only to a preferred embodiment of the invention, and that it is intended to cover all changes and modifications of the example of the invention chosen for the purpose of the disclosure which do not constitute departures from the spirit and scope of the appended claims.

What is claimed is:

1. A method using oil for drying water-bearing food consisting of noodles in strip form comprising the steps of: packing said food in open containers having perforated bottoms, the perforations in the bottoms of said containers being of a size sufficiently small so as to prevent said food from being displaced out of said containers and sufficiently large so as to enable oil to pass therethrough; providing a bath of said oil; sequentially conveying said packed containers through said oil bath in a predetermined path; applying over said containers a removable cover having perforations of about the same size as said container bottoms before conveying said containers through said bath; directing oil against said conveyed containers within said oil bath under a pressure sufficient to cause oil to enter said containers through said perforations and sufficient to urge apart parts of said food in said containers thereby to induce substantially all the surfaces of said food parts to be exposed to said oil; maintaining the temperature of the oil entering said containers at a level at least sufficient to convert water in said food to steam; maintaining contact between said food in said containers and said oil for a period sufficient to at least partly dehydrate said food; and separating the at least partly dehydrated food from said oil.

2. A method as set forth in claim 1, wherein said food consists essentially of noodle dough.

3. A method as set forth in claim 2, wherein the strips of said food in each container are elongated in a common direction and packed side by side in each of a plurality of superimposed layers.

4. A method as set forth in claim 1, wherein said pressurized oil is directed against each conveyed container in an upward direction, said oil and steam formed thereby being released jointly from the batch of said food in said container in an upward direction.

5. A method as set forth in claim 1, wherein said containers are conveyed in said portion of said path in a direction intersecting said stream.

* * * * *